United States Patent
Katayama et al.

(10) Patent No.: US 6,391,419 B1
(45) Date of Patent: May 21, 2002

(54) MAGNETIC RECORDING MEDIUM

(75) Inventors: Kazutoshi Katayama; Kazuyuki Usuki, both of Odawara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 63 days.

(21) Appl. No.: 09/661,058

(22) Filed: Sep. 13, 2000

(51) Int. Cl.⁷ .................................................. G11B 5/82
(52) U.S. Cl. .................. 428/65.3; 428/409; 428/473.5; 428/474.4; 428/694 TC; 428/900; 428/336; 428/65.5; 360/135
(58) Field of Search .............................. 428/336, 473.5, 428/474.4, 409, 694 TC, 900, 65.3, 65.5; 360/135

(56) References Cited

U.S. PATENT DOCUMENTS 5,589,263 A * 12/1996 Ueda et al. .................. 428/336
5,766,766 A * 6/1998 Sasaki et al. ................ 428/408
5,776,602 A * 7/1998 Ueda et al. .................. 428/332
6,096,419 A * 8/2000 Ito et al. ...................... 428/336
6,120,836 A * 9/2000 Usuki .......................... 427/131

* cited by examiner

*Primary Examiner*—Stevan A. Resan
(74) *Attorney, Agent, or Firm*—Sughrue Mion, PLLC

(57) ABSTRACT

A magnetic recording medium, comprising a magnetic layer containing a ferromagnetic metal thin film having micro-size projections on surface thereof and formed by vacuum film forming method and provided at least on one side of a nonmagnetic substrate, a carbon protective layer and a lubricant provided on said magnetic layer, a central axis of a diamond indenter of trilateral pyramid having a tip sharp angle of 90° and a radius of curvature at tip of 35–50 nm being directed perpendicularly to the surface of the nonmagnetic substrate, pressure is applied on the carbon protective layer, and a load obtained when indentation depth of the indenter is 10–25 nm is divided by projection area of indenter contactor, and the quotient, i.e. micro-hardness, is within the range of 10–30 GPa.

17 Claims, No Drawings

MAGNETIC RECORDING MEDIUM

BACKGROUND OF THE INVENTION

The present invention relates to a magnetic recording medium for ultra-high density recording with higher running durability. In particular, the invention relates to a floppy disk for ultra-high density recording with a ferromagnetic thin film and usable at high-speed rotation.

In recent years, with the purpose of recording a large mount of digital information, there are increasing demands n the development of a technique for recording at high recording density. Using a ferromagnetic metal thin film prepared by vacuum film forming method, i.e. sputtering method, vacuum evaporation method, etc., the magnetic recording medium such as a vacuum-deposited tape or a metal thin film type hard disk, etc. is prepared and used in practical application. In this type of magnetic recording medium, high magnetic energy can be easily obtained, and flat surface can be easily achieved by smoothening the surface of non-magnetic substrate. In this respect, it is characterized in that spacing loss is low and high electromagnetic transfer characteristics can be attained, and this is suitable for a method to manufacture a high-density recording material.

On the other hand, compared with the hard disk, a floppy disk type magnetic recording medium has higher impact resistance and can be produced at lower cost, and it is widely used in 2HD class products. Further, in recent years, a high-density magnetic recording medium represented by Zip (Iomega Inc.) based thin layer coating technique has been introduced to practical use. In the magnetic recording medium as described above, recording and reproduction are performed at high speed of about 3000 rpm, and high transfer rate closer to that of hard disk can be achieved. However, its recording density is still less than $\frac{1}{10}$ of that of the hard disk. This is attributable to the fact that a floppy disk type magnetic recording medium which has the magnetic layer produced by sputtering method as in case of the hard disk is not yet suitable for practical application.

There are various reasons for this. One of the reasons is that, in a floppy disk produced by the sputtering method, it is difficult to maintain high running durability and to attain high reliability for practical use.

In the floppy disk produced by the sputtering method, it is more difficult to maintain high durability than the floppy disk produced by the coating method. The reasons are that the magnetic layer of the floppy disk produced by the coating method comprises magnetic particles and inorganic particles, etc. enclosed by organic binder and the uppermost layer is the organic binder, that there are gaps between particles, and also that the magnetic layer contains a lubricant. As a result, the floppy disk of this type has high wear resistance, high shock resistance, and better lubricating property, while the floppy disk produced by the sputtering method has a magnetic layer comprising metal thin film which is more susceptible to wearing.

For this reason, there have been attempts to form a solid protective layer on the magnetic layer as in the case of hard disk for the purpose of improving the durability. Above all, it is known that a carbon protective layer has high durability. However, even when a carbon protective layer similar to the case of the hard disk are formed on the floppy disk, running durability can be improved but it is not possible yet to attain high reliability for practical use. In case of hard disk, when the number of revolutions of disk is increased, the head is floated up by floating force applied on the head, and it is used under the condition that the head and the hard disk are not in contact with each other. In case of floppy disk, even when the number of revolutions of the disk is increased, vibration of the disk (surface deviation) is high, and the head cannot be floated up in stable manner. Even at high-speed rotation, the head and the floppy disk come frequently into contact with and strike against each other.

For this reason, with the purpose of increasing the running durability and of maintaining high reliability for practical use, the floppy disk must have the following components and properties:

(1) Lubricating layer having high lubricating property;
(2) Protective layer with high wear resistance;
(3) Well-controlled surface roughness not to generate high frictional force even when head and disk are in contact with each other;
(4) Well-controlled surface hardness not to cause detachment or destruction even when head and disk come into contact with each other; and
(5) Low surface deviation to reduce frequency of contact.

In particular, unlike the case of the hard disk, which is basically operated on non-contact basis, it is necessary to design a magnetic recording medium by giving consideration on the contact between the head and the disk during running operation.

As the protective layer with high wear resistance, an amorphous carbon film containing carbon and hydrogen and called "diamond-like carbon" (DLC) is most commonly used. It is used as the protective layer for hard disk or for video tape having metal thin film type magnetic layer and formed by vacuum deposition. Diamond-like carbon can be relatively easily produced. It is hard and has low frictional force and is very unlikely to cause seizure.

However, it has been found that, when the commonly used diamond-like carbon containing carbon and hydrogen is used as the protective layer for floppy disk, sufficient durability cannot be obtained. The reason for this is that, when diamond-like carbon is used as a protective layer, frictional force is gradually increased as the head and the disk are repeatedly brought into contact with each other. As a result, the diamond-like carbon may be destroyed or the magnetic layer may be destroyed. On the contrary, soft DLC cannot satisfy the requirements on wear resistance.

Further, regarding the lubricant, it has been not possible to improve the running durability of the floppy disk produced by the sputtering method to full extent.

As a ferromagnetic metal thin film type magnetic recording medium, which comprises a ferromagnetic metal thin film formed by vacuum film forming method and provided on a non-magnetic substrate as a magnetic layer and a protective layer provided on the magnetic layer, JP-B-52-18001 describes a thin film magnetic recording member, which comprises a thin film magnetic recording medium with an inorganic insulating amorphous material coated on it. Also, the conditions for providing a carbon protective layer on a magnetic recording medium are defined in each of JP-A-61-45412, JP-A-62-298923, JP-A-6-195695, etc. However, there has been no invention which directly defines the property of the protective film.

JP-B-5-56567 describes a magnetic recording medium, which has a carbon protective layer with a specific Vickers hardness formed on a ferromagnetic metal thin film. However, it is not possible to be accurately evaluate the property of thin film by Vickers hardness.

JP-A-6-349055 describes a magnetic recording medium by defining average roughness on central line of the carbon protective layer. Although it is defined according to the measurement results of micro-hardness, it is not valid enough as a method for evaluation.

It is an object of the present invention to provide a ferromagnetic metal thin film type magnetic recording medium for high density recording with higher running durability. In particular, the invention provides a floppy disk, which is suitable for high density recording at high-speed rotation.

SUMMARY OF THE INVENTION

The above object can be attained by the magnetic recording medium of the present invention, which comprises a magnetic layer containing a ferromagnetic metal thin film having micro-size projections on surface thereof and formed by vacuum film forming method and provided at least on one side of a nonmagnetic substrate, a carbon protective layer and a lubricant provided on said magnetic layer, a central axis of a diamond indenter of trilateral pyramid having a tip sharp angle of 90° and a radius of curvature at tip of 35–50 nm being directed perpendicularly to the surface of the nonmagnetic substrate, pressure is applied on the carbon protective layer, and a load obtained when indentation depth of the indenter is 10–25 nm is divided by projection area of indenter contactor, and the quotient, i.e. micro-hardness, is within the range of 10–30 GPa.

Also, the present invention provides a magnetic recording medium as described above, wherein said nonmagnetic substrate is a flexible plastic substrate, and the magnetic recording medium is a disk-type magnetic recording medium.

Further, the present invention provides a magnetic recording medium as described above, wherein thickness of the carbon protective film is within the range of 2.5 to 30 nm.

Also, the present invention provides a magnetic recording medium as described above, wherein the carbon protective layer is formed using ethylene as raw material gas.

Further, the present invention provides a magnetic recording medium as described above, wherein the nonmagnetic substrate is aramide film or polyimide film.

Also, the present invention provides a magnetic recording medium as described above, wherein an undercoating film comprising polyimide resin or organopolysiloxane is formed on the nonmagnetic substrate.

DESCRIPTION OF THE PREFERRED EMBODIMENT

After making fervent efforts to overcome the above problems, the present inventors have found that it is possible to evaluate the property of the ferromagnetic metal thin film type magnetic recording medium with higher durability according to the values of surface micro-size elasto-plastic deformation property measured under specific conditions. Also, it has been found that a magnetic recording medium with excellent performance characteristics can be obtained by producing the magnetic recording medium with physical properties on the surface with specific values.

Further, it has been found that, in a magnetic recording medium comprising a flexible support member with specific composition, it is possible to obtain a magnetic recording medium which can achieve high density recording and has better durability.

Description will be given below on a method to measure micro-hardness in the present invention.

A diamond indenter is designed in a form of a trilateral pyramid with sharp angle of 90° and radius of curvature at the tip of 35–50 nm. It is applied on a protective layer in perpendicular direction, and the applied load is gradually increased to the maximum load so that indentation depth of the indenter into the carbon protective layer will be 10–25 nm. After the maximum load has been reached, the load is gradually decreased to 0. The maximum load P in this case is divided by a projection area A of the indenter contact, and hardness is calculated as P/A.

To measure the load and the displacement caused by an indenter, a pickup electrode comprising an indenter connected between two electrodes is mounted. By determining the changes of capacitance in association with the movement of the pickup electrode, it is possible to measure the load and the displacement with high accuracy.

The projection area A of the indenter contact is obtained as follows: In a depth-load curve obtained by indentation test, initial 30% of unloading curve is approximated to a straight line for extrapolation, and a point where it crosses depth axis is regarded as contact depth "d" of the indenter contact. From the shape of the indenter, the projection area can be obtained as a function of the value of "d".

Using a standard specimen which shows the hardness of 9–10 GPa when fused quartz is indented, the device is calibrated in advance.

It has been found that high durability can be attained in case micro-hardness obtained when indentation depth of the indenter is 10–25 nm is within the range of 10–30 GPa.

In particular, in case of a recording medium using a flexible support member such as a floppy disk, head and disk come into contact at high speed even when the number of revolutions of the disk is increased, and surface hardness is very important for the purpose of maintaining high wear resistance. If the surface coming into contact with the head during running operation is too soft, wear resistance is not high enough, and high running durability cannot be ensured. On the other hand, the harder the surface is, the more the amount of wearing decreases under the same condition. In case the amount of deformation of the magnetic recording medium is high, it is not possible to follow the deformation of the magnetic recording medium. When the contact with the head occurs under excessive force, the carbon protective film or the magnetic film may be detached or cracks may occur without being able to endure the shock.

From the reasons as described above, there is the optimal range for surface hardness of the magnetic recording medium. Such optimal range of hardness is within the range of 10–30 GPa in the hardness measured by the measuring method of the present invention when indentation depth of the indenter is 10–25 nm. If the surface hardness is lower than this range, scraping may occur. If it is higher than the above range, the carbon protective film or the magnetic film may be detached, or cracks may occur. More preferably, the hardness is within the range of 15–25 GPa.

The surface hardness of the floppy disk varies according to the protective film, the magnetic layer, the nonmagnetic underlying layer, and the nonmagnetic substrate. For this reason, it is necessary to design a magnetic recording medium by adequately combining the protective film, the magnetic film, the underlying layer, and the nonmagnetic substrate.

As the nonmagnetic substrate to be used in the magnetic recording medium of the present invention, a flexible substrate may be used, and more preferably, a plastic substrate may be used. As the plastic substrate, polyethylene terephthalate, polyethylene naphthalate, polyimide, polyamide, polyamideimide, polybenzoxazole, etc. may be used. More preferably, polyimide or polyamide may be used, or most preferably, polyamide having higher Young's modulus may be used. Because the surface hardness is also under the influence of the support member, surface hardness can be increased when polyamide with higher Young's modulus is used. Polyamide is also advantageous in terms of durability.

The thickness of these plastic substrates is preferably 20–200 $\mu$m, or more preferably, 30–90 $\mu$m. It is preferable that the thickness of the plastic substrate is 30–50 $\mu$m in case diameter of the disk is relatively small, e.g. 1.8 inches, and it is 50–90 $\mu$m in case diameter of the disk is relatively large, e.g. 3.5 inches.

Curling amount depends upon the size of the disk. For instance, in case of a 3.5-inch floppy disk, it is 2 mm or less, or more preferably, 1 mm. To maintain high electromagnetic transfer characteristics, it is preferable that surface roughness (Ra) of the magnetic film is not more than 2 nm, and the maximum surface roughness (Rmax) is not more than 6 nm.

When the surface of the magnetic film of polyimide film or polyamide film is not so smooth as the film of polyethylene terephthalate, polyethylene naphthalate, etc., an undercoating layer may be prepared on the magnetic layer of the film for the purpose of smoothening. The thickness of the undercoating layer is preferably 0.1–3 $\mu$m.

Surface hardness also varies according to the undercoating layer. As an undercoating material to be used for the undercoating layer, polyester resin as commonly used as the undercoating layer of the magnetic recording medium may be used. From the viewpoint of the surface hardness, it is preferable to use thermosetting resin such as polyamide, polyimide, polyamideimide, polysiloxane, etc. The thermosetting resin (e.g. the thermosetting imide resin) can be produced by the following method: A monomer having an imide structure and a polymerizable terminal group in molecule is coated, and it is polymerized by heating to form a polyimide structure. As these compounds, the compounds synthesized by the synthetic method already known in the art as described in JP-A-59-80662, JP-A-60-178862, JP-A-61-18761, JP-A-63-170358, JP-A-7-53516, etc. may be used. Such compounds are commercially marketed by Maruzen Petrochemical Co., Ltd. as BANI series and ANI series products.

Also, a monomer containing a silane coupling agent having epoxy group is coated, and then, thermosetting is performed to produce thermosetting silicone resin.

It is preferable to provide micro-size projections on the surface of the synthetic resin substrate or on the surface of the undercoating film with the purpose of decreasing friction coefficient with sliding member such as the magnetic head. For example, $SiO_2$, $Al_2O_3$, $TiO_2$, etc. or organic fine particles may be coated together with the above resin binder on the substrate or on the undercoating layer, and the projections may be provided. To prepare such micro-size projections on the surface, there are methods such as a method to coat spherical silica particles, a method to form organic projections by coating emulsion, etc. To maintain heat-resistant property, it is preferable to use silica particles. To fix the projections on film surface, a binder may be used. To maintain heat-resistant property, it is preferable to use resin with high heat-resistant property. In particular, it is preferable to use thermosetting imide or thermosetting silicone resin as such material. The height of the micro-size projections is 5–60 nm, or more preferably, 10–30 nm. Its density is preferably 0.1–100 projections/$\mu m^2$, or more preferably, 1–30 projections/$\mu m^2$. If the height of the micro-size projection is too high, electromagnetic transfer characteristics are decreased due to spacing between the recording/reproducing head and the medium. If the micro-size projections are too low, the effect to improve the sliding property is decreased. If the density of the micro-size projections is too low, the effect to improve sliding property is decreased. If it is too high, higher projections are increased due to the increase of agglomerated particles, and this leads to lower electromagnetic transfer characteristics. The coating thickness of the binder is preferably not more than 20 nm. If the binder is too thick, blocking (i.e. the bonding to the rear surface of the film) may occur after drying.

As ferromagnetic metal thin film to be used as the magnetic layer in the magnetic recording medium of the present invention, the film prepared by the vacuum deposition method or by the sputtering method may be used.

The thickness of the magnetic layer is preferably 10–300 nm, or more preferably, 15–60 nm.

In the magnetic recording medium of the present invention, a nonmagnetic underlying layer may be provided under the magnetic layer. It is preferable that the underlying layer and the magnetic layer are provided by vacuum film forming method. In particular, it is preferable to use sputtering method because it is possible to form the film without changing the component ratio of the elements in the materials.

As the composition of the film, metal or alloy primarily based on cobalt may be used. More concretely, Co—Cr, Co—Ni—Cr, Co—Cr—Ta, Co—Cr—Pt, Co—Cr—Ta—Pt, Co—Cr—Pt—Si, Co—Cr—Pt—B, etc. may be used. In particular, it is preferable to use Co—Cr—Pt or Co—Cr—Pt—Ta to improve electromagnetic transfer characteristics.

Further, the ferromagnetic metal thin film may be designed in multi-layer structure to improve electromagnetic transfer characteristics or a seed layer or an intermediate layer may be provided to improve crystallinity of the nonmagnetic underlying layer and the underlying layer.

As the materials for the nonmagnetic underlying layer, Cr, or Cr alloy, e.g. an alloy with W, Ti, Mo, V, Ta, B, Si or Mo, or an alloy of Mo with the above elements is preferably used. The film thickness is preferably 5–500 nm, or more preferably, 10–150 nm.

If film thickness of the carbon protective layer is too thick, electromagnetic transfer characteristics may be worsened or adhesion to the magnetic layer may be decreased. If film thickness is too thin, wear resistance is decreased. For this reason, film thickness is preferably 2.5–30 nm, or more preferably, 5–20 nm.

For the purpose of improving the adhesion with the lubricant to be added to the carbon protective layer, the surface of the carbon protective layer may be treated with oxidizing gas or inert gas. If a silicon intermediate layer is provided on the surface of the magnetic film, the adhesion may be increased further.

To produce the carbon protective layer, it is effective to use CVD method. For example, plasma is generated under the atmosphere where very small quantity of hydrocarbon is present, and hydrocarbon is decomposed. By applying bias voltage on the active material thus generated, it is stacked on the base material. As the hydrocarbon to be used as the materials, alkane such as methane, ethane, propane, butane, etc., alkene such as ethylene, propylene, etc., or alkyne such as acetylene, etc. may be used. Above all, it is preferable to use ethylene, methane, ethane, etc. It is preferable to introduce rare gases such as argon, xenon, helium, etc. as carrier gas together with these hydrocarbon gases. To reform the carbon protective layer, nitrogen or hydrogen may be introduced into the plasma. For instance, if hydrogen is introduced, etching effect during film formation is increased, and a carbon protective layer with high hardness can be obtained. When nitrogen is introduced, hardness is somewhat decreased, but it is possible to decrease internal stress and to reduce friction coefficient.

To generate the plasma, a method using high frequency, a method using ECR, a method using thermal filament, etc. may be used. By applying a voltage of preferably −200 to −700 V, or more preferably, −400 to −600 V, on the magnetic layer where the film is to be formed, a carbon film is prepared, and a carbon protective layer of fine quality and high hardness can be produced.

In the carbon protective layer thus prepared, the structure of carbon is amorphous structure, graphite structure, diamond structure or mixing of these structures. As the carbon protective film, an amorphous hard carbon film commonly called as diamond-like carbon is preferably used.

On the surface of the magnetic layer where the protective layer is provided, etching may be performed in advance by reverse sputtering with the polarity opposite to that of film formation. For the etching, it is preferable that the surface of the magnetic layer is less susceptible to decomposition or desorption by plasma. As the gases to be used for the etching, inert gas such as argon, or reactive gas such as hydrogen or oxygen may be preferably used. Using the carbon film thus prepared and by selecting the hardness of the carbon film so that it will be the surface hardness of the present invention, it is possible to prepare a magnetic disk with high durability.

In the magnetic recording medium of the present invention, for the purpose of improving the running durability and the corrosion resistance, it is preferable to add a lubricant to the protective film, and a rust preventive agent is preferably added.

In the magnetic disk of the present invention, it is necessary to provide a lubricating layer or a rust-preventive agent on the protective layer to improve running durability and corrosion-resistant property.

As the lubricant, hydrocarbon type lubricant, fluorine type lubricant, extreme-pressure additive, etc. already known in the art may be used. As the hydrocarbon type lubricant, carboxylic acids such as stearic acid, oleic acid, etc., esters such as butyl stearate, sulfonic acids such as octadecyl sulfonic acid, phosphoric acid esters such as monooctadecyl phosphate, alcohols such as stearyl alcohol, oleyl alcohol, etc., carboxylic acid amide such as stearic acid amide, etc., amines such as stearyl amine may be used.

As the fluorine type lubricant, a lubricant prepared by substituting a part or all of the alkyl groups in the hydrocarbon type lubricant by fluoroalkyl group or perfluoropolyether group may be used. As the perfluoropolyether group, perfluoromethylene oxide polymer, perfluoroethylene oxide polymer, perfluoro-n-propylene oxide polymer $(CF_2CF_2CF_2O)_n$, perfluoroisopropylene oxide polymer $(CF(CF_3)CF_2O)_n$ or copolymer of these compounds may be used. Also, a compound prepared by introducing fluorine or fluorinated alkyl group into phosphagen ring is also thermally and chemically stable and may be used.

As the extreme-pressure additive, phosphoric acid esters such as trilauryl phosphate, phosphorous acid esters such as trilauryl phosphite, thiophosphorous acid esters such as trilauryl trithiophosphite, sulfur type extreme-pressure agent such as dibenzyl disulfide may be used.

The lubricants as described above may be used alone or in combination. To apply these lubricants on the protective layer, the lubricant is dissolved in an organic solvent, and it is coated by wire bar method, gravure method, spin coat method, dip coat method, etc., or it may be attached by vacuum evaporation method.

The coating quantity of the lubricant is preferably 1–30 $mg/m^2$, or more preferably, 2–20 $mg/m^2$.

As the rust-preventive agent to be used in the present invention, nitrogen-containing heterocyclic compounds such as benzotriazole, benzimidazole, purine, pyrimidine, etc., derivatives prepared by introducing alkyl side-chain to or the base nucleus, nitrogen- or sulfur-containing heterocyclic compounds and derivatives such as benzothiazole, 2-mercaptobenzothiazole, tetrazaindene cyclic compound, thiouracil compound may be used

[Embodiments]

In the following, description will be given on concrete examples of the present invention:

EXAMPLE 1–5 AND COMPARATIVE EXAMPLE 1–5

On both sides of an aramide film of 50 μm in thickness, an undercoating film of 1 μm in thickness comprising polyimide resin was prepared. Spherical silica particles with particle size of 18 nm were dispersed in cyclohexanone, and this organosilica sol with particle size of 18 nm was coated on the film by dip coating method. This was dried at 250° C. for one hour, and micro-size projections were formed on the surface of the undercoating film. The density of the micro-size projections thus formed was 10 projections/$\mu m^2$.

Next, this support member was retained in a holder, and this was placed in a sputtering device for the formation of the magnetic film. The support member was heated at 200° C., and a Cr—Ti (atom ratio 80:20) underlying layer of 60 nm in thickness was formed by DC magnetron sputtering method. Further, a Co—Pt—Cr (atom ratio 68:12:20) magnetic film of 30 nm in thickness was formed. The underlying film and the magnetic film were formed on both surfaces of the support member. Further, the surface of the magnetic film was cleaned up by argon glow method, and ethylene was introduced at a flow rate of 90 ccm, nitrogen was introduced at a flow rate of 60 ccm, and argon was introduced at a flow rate of 300 ccm. Under the conditions with substrate bias voltage at −500 V and high frequency power of 500 W with frequency of 13.56 MHz, a nitrogen-containing diamond-like carbon protective film of 20 nm in thickness was formed by high frequency plasma CVD method. On the surface of the protective film, perfluoropolyether type lubricant (Ausimont; Fomblin Z-Dol) dissolved in a fluorine type solvent was coated, and this was dried, and a lubricant film of 1 nm in thickness was prepared.

This specimen was punched to a disk-like shape and was incorporated in a shell for Zip, and a floppy disk for the test was prepared.

EXAMPLE 2

A specimen was prepared by the same procedure as in Example 1 except that nitrogen was not introduced when the diamond-like carbon protective layer was formed, and a diamond-like carbon protective layer was formed using ethylene and argon as the materials.

EXAMPLE 3

A specimen was prepared by the same procedure as in Example 1 except that the nonmagnetic substrate was changed to polyimide film of 50 μm in thickness.

EXAMPLE 4

A specimen was prepared by the same procedure as in Example 1 except that the method to prepare the undercoating film was changed, i.e. phenyltriethoxysilane, glycidoxypropyl-3-methoxysilane (1:1 in weight ratio), and hydrochloric acid were dissolved in ethanol. Then, aluminum acetyl acetate was added as hardening agent, and a coating solution was prepared. This solution was coated by gravure coating method, and this was dried at 100° C., and a coating film was prepared. Then, the coating film was heated at 170° C. for 20 seconds, and hardening and solvent removing process were performed, and an undercoating film comprising organopolysiloxane of 0.3 μm in thickness was obtained.

EXAMPLE 5

A specimen was prepared by the same procedure as in Example 4 except that the non-magnetic substrate was changed to polyimide film of 50 μm in thickness.

COMPARATIVE EXAMPLE 1

A specimen was prepared by the same procedure as in Example 1 except that the film was formed without applying bias voltage when the carbon protective film was prepared.

COMPARATIVE EXAMPLE 2

A specimen was prepared by the same procedure as in Example 1 except that the protective film was prepared by DC magnetron sputtering method using graphite as target, and a carbon protective layer of 20 nm in thickness was prepared.

COMPARATIVE EXAMPLE 3

A specimen was prepared by the same procedure as in Example 1 except that polyethylene terephthalate of 50 μm in thickness was used as the nonmagnetic base material.

COMPARATIVE EXAMPLE 4

A specimen was prepared by the same procedure as in Example 1 except that the method to prepare the undercoating film was changed, i.e. tetraethoxysilane, methyltriethoxysilane (1:1 in weight ratio), and hydrochloric acid were dissolved in ethanol, and aluminum acetyl acetate was added as a hardening agent, and a coating solution was prepared. This solution was coated on the film by gravure coating method, and it was dried at 100° C., and a coating film was prepared. The coating film was then heated at 170° C. for 20 seconds, and hardening and solvent removing process were performed and an undercoating film comprising organopolysiloxane of 0.3 μm in thickness was prepared.

COMPARATIVE EXAMPLE 5

A specimen was prepared by the same procedure as in Example 1 except that the thickness of the protective film was changed to 3 nm.

The specimens prepared in the above Examples and Comparative examples were evaluated by the following methods. The results are summarized in Table 1.

(EVALUATION METHOD)
(1) Method to Determine Hardness

Using a micro-hardness measuring instrument (Triboscope; Hysitron Inc.), each specimen was cut to a piece to have each side of 1 cm under the following conditions:

Indenter:
 Diamond indenter;
 Sharp angle at tip 90°;
 Radius of curvature at tip: 35–50 nm;
 (Type No.: T1-037)
 Maximum load: 15 μN
 Measuring time: 5 seconds Each specimen was attached on a metal plate using double-sided adhesive tape. The metal plate with the specimen attached on it was mounted on the measuring instrument and maximum load was applied, and the load was then gradually decreased to zero. The amount of indentation was measured using an atomic force microscope (Digital Instruments; NanoScope II). The maximum load P was divided by projection area A of the indenter contact, and the quotient P/A was regarded as the hardness. The results of the measurement are shown in Table 1.

(2) Running Durability Test

The magnetic recording medium for Zip prepared above was placed on a Zip drive unit (Fuji Photo Film; Zip-100) so that the head was to run repeatedly on the same track, and a signal with frequency of 8 MHz was recorded and reproduced. The time until the reproduction output was turned to −3 dB of the initial value was measured. Environmental conditions for the test were 25° C. and 50% relative humidity.

Next, after the completion of the running durability test, the surface of the specimen was examined under differential interference microscope at a magnifying factor of 100×for 5 visual fields. Evaluation was made and the results were classified in four grades by visual inspection:

Not acceptable: Extreme flaws were observed in 3 visual fields or more;
No good: Slight flaws were observed in 3 visual fields or more;
Good: Slight flaws were observed in 1 to 2 visual fields;
Very good: Neither flaw nor damage observed

TABLE 1

| | Hardness (GPa) | Indentation depth (nm) | Running time (h) | External appearance |
|---|---|---|---|---|
| Example 1 | 17.0 | 13 | 300 or more | Very good |
| Example 2 | 27.2 | 10 | 288 | Good |
| Example 3 | 10.8 | 14 | 196 | Good |
| Example 4 | 22.1 | 11 | 300 or more | Very good |
| Example 5 | 14.4 | 12 | 201 | Good |
| Comparative example 1 | 1.9 | 25 | 1 or less | Not acceptable |
| Comparative example 2 | 9.7 | 14 | 30 | Not acceptable |
| Comparative example 3 | 8.0 | 15 | 132 | No good |
| Comparative example 4 | 30.5 | 10 | 165 | No good |
| Comparative example 5 | 3.1 | 23 | 6 | Not acceptable |

From Table 1, it is evident that, in the examples with hardness of 10–30 GPa, the running durability is much superior to the comparative examples, which are out of the scope of the present invention.

As described above, the present invention provides a magnetic recording medium, which comprises a ferromagnetic metal thin film magnetic layer prepared by vacuum film forming method and provided at least on one side of a nonmagnetic substrate, a carbon protective layer and a lubricant provided on said magnetic layer. Surface micro-size elasto-plastic deformation characteristics determined by ultra-micro-size indenter of the medium are defined to a specific range. As a result, durability is improved, and a floppy disk for ultra-high density recording with high durability at high-speed rotation is obtained.

What is claimed is:

1. A magnetic recording medium, comprising a magnetic layer containing a ferromagnetic metal thin film having micro-size projections on surface thereof and formed by vacuum film forming method and provided at least on one side of a nonmagnetic substrate, a carbon protective layer and a lubricant provided on said magnetic layer, a central axis of a diamond indenter of trilateral pyramid having a tip sharp angle of 90° and a radius of curvature at tip of 35–50 nm being directed perpendicularly to the surface of the nonmagnetic substrate, pressure is applied on the carbon protective layer, and a load obtained when indentation depth of the indenter is 10–25 nm is divided by projection area of indenter contactor, and the quotient, i.e. micro-hardness, is within the range of 10–30 GPa.

2. A magnetic recording medium according to claim 1, wherein said nonmagnetic substrate is a flexible plastic substrate, and the magnetic recording medium is a disk-type magnetic recording medium.

3. A magnetic recording medium according to claim 1, wherein thickness of the carbon protective film is within the range of 2.5 to 30 nm.

4. A magnetic recording medium according to claim 2, wherein thickness of the carbon protective film is within the range of 2.5 to 30 nm.

5. A magnetic recording medium according to claim 1, wherein the carbon protective layer is formed using ethylene as raw material gas.

6. A magnetic recording medium according to claim 2, wherein the carbon protective layer is formed using ethylene as raw material gas.

7. A magnetic recording medium according to claim 3, wherein the carbon protective layer is formed using ethylene as raw material gas.

8. A magnetic recording medium according to claim 4, wherein the carbon protective layer is formed using ethylene as raw material gas.

9. A magnetic recording medium according to claim 1, wherein the nonmagnetic substrate is aramide film or polyimide film.

10. A magnetic recording medium according to claim 2, wherein the nonmagnetic substrate is aramide film or polyimide film.

11. A magnetic recording medium according to claim 3, wherein the nonmagnetic substrate is aramide film or polyimide film.

12. A magnetic recording medium according to claim 4, wherein the nonmagnetic substrate is aramide film or polyimide film.

13. A magnetic recording medium according to claim 5, wherein the nonmagnetic substrate is aramide film or polyimide film.

14. A magnetic recording medium according to claim 6, wherein the nonmagnetic substrate is aramide film or polyimide film.

15. A magnetic recording medium according to claim 7, wherein the nonmagnetic substrate is aramide film or polyimide film.

16. A magnetic recording medium according to claim 8, wherein the nonmagnetic substrate is aramide film or polyimide film.

17. A magnetic recording medium according to one of claims 1 to 16, wherein an undercoating film comprising polyimide resin or organopolysiloxane is formed on the nonmagnetic substrate.

* * * * *